(12) United States Patent
Klair et al.

(10) Patent No.: US 11,281,834 B1
(45) Date of Patent: Mar. 22, 2022

(54) PROTECTION OF HIGH-LEVEL LANGUAGE SIMULATION MODELS

(71) Applicant: Xilinx, Inc., San Jose, CA (US)

(72) Inventors: Rajvinder S. Klair, San Jose, CA (US); Alec J. Wong, San Jose, CA (US); Sahil Goyal, Hyderabad (IN); Amit Kasat, Hyderabad (IN); Brian Cotter, Transent (GB); Herve Alexanian, San Jose, CA (US)

(73) Assignee: XILINX, INC., San Jose, CA (US)

( * ) Notice: Subject to any disclaimer, the term of this patent is extended or adjusted under 35 U.S.C. 154(b) by 429 days.

(21) Appl. No.: 16/531,346

(22) Filed: Aug. 5, 2019

(51) Int. Cl.
| | |
|---|---|
| *G06F 30/36* | (2020.01) |
| *G06F 30/367* | (2020.01) |
| *G06F 8/41* | (2018.01) |
| *G06F 8/70* | (2018.01) |
| *G06F 21/60* | (2013.01) |
| *G06F 9/445* | (2018.01) |
| *G06F 8/54* | (2018.01) |

(52) U.S. Cl.
CPC .............. *G06F 30/367* (2020.01); *G06F 8/41* (2013.01); *G06F 8/54* (2013.01); *G06F 8/70* (2013.01); *G06F 9/445* (2013.01); *G06F 21/602* (2013.01)

(58) Field of Classification Search
None
See application file for complete search history.

(56) References Cited

U.S. PATENT DOCUMENTS

| | | | |
|---|---|---|---|
| 2004/0025123 A1* | 2/2004 | Angilivelil ......... | G01R 31/3016 700/109 |
| 2007/0005329 A1* | 1/2007 | Altieri ..................... | G06F 30/30 703/19 |
| 2007/0106488 A1* | 5/2007 | Chang ..................... | G06F 30/33 703/14 |

* cited by examiner

*Primary Examiner* — Craig C Dorais
(74) *Attorney, Agent, or Firm* — Crawford Maunu PLLC (57) ABSTRACT

Approaches for protection of HLL simulation models in a circuit design having unprotected high-level language (HLL) program code and first metadata of a shared library of executable simulation models that are based on sensitive HLL simulation models. A design tool determines a first storage location of the shared library based on the first metadata and compiles the unprotected HLL program code into an executable object. The design tool links the executable object with the library of executable simulation models from the first storage location and then simulates the circuit design by executing the executable object and loading the executable simulation models in response to initiation by the executable object.

20 Claims, 4 Drawing Sheets

PROTECTION OF HIGH-LEVEL LANGUAGE SIMULATION MODELS

TECHNICAL FIELD

The disclosure generally relates to simulating circuit designs.

BACKGROUND

An electronic system can be implemented as a combination of software executing on a processor(s), programmable logic configured to perform logic functions, application-specific integrated circuits (ASICs), and various special purpose processors. In some cases an entire system can be implemented on a single device. For example, the VERSAL™ adaptive compute acceleration platform (ACAP) from XILINX, Inc. includes programmable logic, processor cores, memory circuits, vector processor circuits, and high-speed input/output (I/O) circuits integrated on multiple integrated circuit dice in a package. The VERSAL ACAP is one example of a device that can be referred to as a "system-on-chip" (SoC) or "system-in-package" (SiP).

An electronic system design can include components developed by unaffiliated entities. For example, some components might be developed by an entity who will sell end products based on the design, and other components might be developed by a party who is in the business of developing and selling design components. The party selling the design components may also provide simulation models to support simulation of those components. The source code specification of a simulation model might describe an algorithm that required significant resources to develop and/or contain sensitive proprietary technology that needs to be secured for compliance with export regulations. Thus, simulation model providers may view their simulation models as an asset worthy of protection.

For designs targeted to SoCs, the simulation can involve various simulation models. A simulation model defines prototype functionality of hardware circuit to be implemented on a target integrated circuit (IC) device. The simulation models can be compiled into program code, which can be executed on a computer system to simulate operations of the modeled hardware circuits in conjunction with user-developed components. Some simulation models can be specified in a hardware description language (HDL), and other simulation models can be specified in a high-level language (HLL). Examples of HDLs include Verilog, System Verilog, and VHDL, and examples of HLLs include C, C++, and SystemC.

SUMMARY

A disclosed method includes inputting to a design tool executing on a computer system, a circuit design having unprotected high-level language (HLL) program code and first metadata of a shared library of executable simulation models that are based on sensitive HLL simulation models. The design tool determines a first storage location of the shared library based on the first metadata and compiles the unprotected HLL program code into an executable object. The design tool links the executable object with the library of executable simulation models from the first storage location. After linking, the circuit design is simulated by executing the executable object and loading the executable simulation models in response to initiation by the executable object.

A disclosed system includes one or more computer processors and a memory arrangement coupled to the one or more computer processors. The memory arrangement is configured with instructions that when executed by the one or more computer processors cause the one or more computer processors to perform operations including inputting a circuit design having unprotected high-level language (HLL) program code and first metadata of a shared library of executable simulation models that are based on sensitive HLL simulation models. Execution of the instructions causes the one or more computer processors to determine a first storage location of the shared library based on the first metadata and compile the unprotected HLL program code into an executable object. Execution of the instructions causes the one or more computer processors to link the executable object with the library of executable simulation models from the first storage location by the design tool and to simulate the circuit design by executing the executable object and loading the executable simulation models in response to initiation by the executable object.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings in which.

DETAILED DESCRIPTION

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

Simulation models can be written in human readable HDLs or HLLs and can define sensitive and proprietary technology. In some instances, the algorithms specified in the code may be subject to regulatory export controls. Simulation models, or portions thereof, that are subject to export controls or embody algorithms a provider desires to protect, are referred to herein as "sensitive" simulation models. Simulation models that are not sensitive simulation models are referred to as "unprotected" simulation models.

For HDL-based sensitive simulation models, the sensitive code can be encrypted consistent with the IEEE-1735 standard before shipping the code to customers. A simulator tool recognizes the protected HDL and decrypts the protected code internally without exposing the proprietary details of the code.

For HLL simulation models, there is no recognized standard for protecting the HLL code. The reason for the lack of standardized protection can be traced to the widespread use of open source GNU compilers, such as g++ or gcc, by design tools to compile HLL simulation models. Involving open source compilers in the protection of sensitive code could lead to exposure of the sensitive code. To protect sensitive code, proprietary algorithms could be developed by the owner of the sensitive HLL simulation models. However, because GNU compilers are open source tools, GNU licensing terms would require disclosure of the sensitive HLL model source code to simulator vendors for applying the protection techniques in order obtain the source code during simulation runs.

The disclosed approaches provide protection of sensitive HLL simulation models from exposure of proprietary algorithms. In addition, the disclosed approaches improve computer performance during circuit simulation. Sensitive HLL simulation models are provided to an end-user only as executable models in a shared library. The design tool can construct an executable object from a circuit design prepared by the end-user. The circuit design can include HLL and/or HDL source and objects having one or more associated sensitive simulation models. The design tool initiates execution of an executable object and loads the executable models when called upon during the simulation run.

By providing pre-compiled library modules for simulation and not distributing source code of the sensitive simulation models, proprietary algorithms can be protected from unauthorized disclosure. In addition, the pre-compiled library modules eliminate having to compile the simulation models on the fly or during simulation, thereby improving computer performance.

Figure 1:
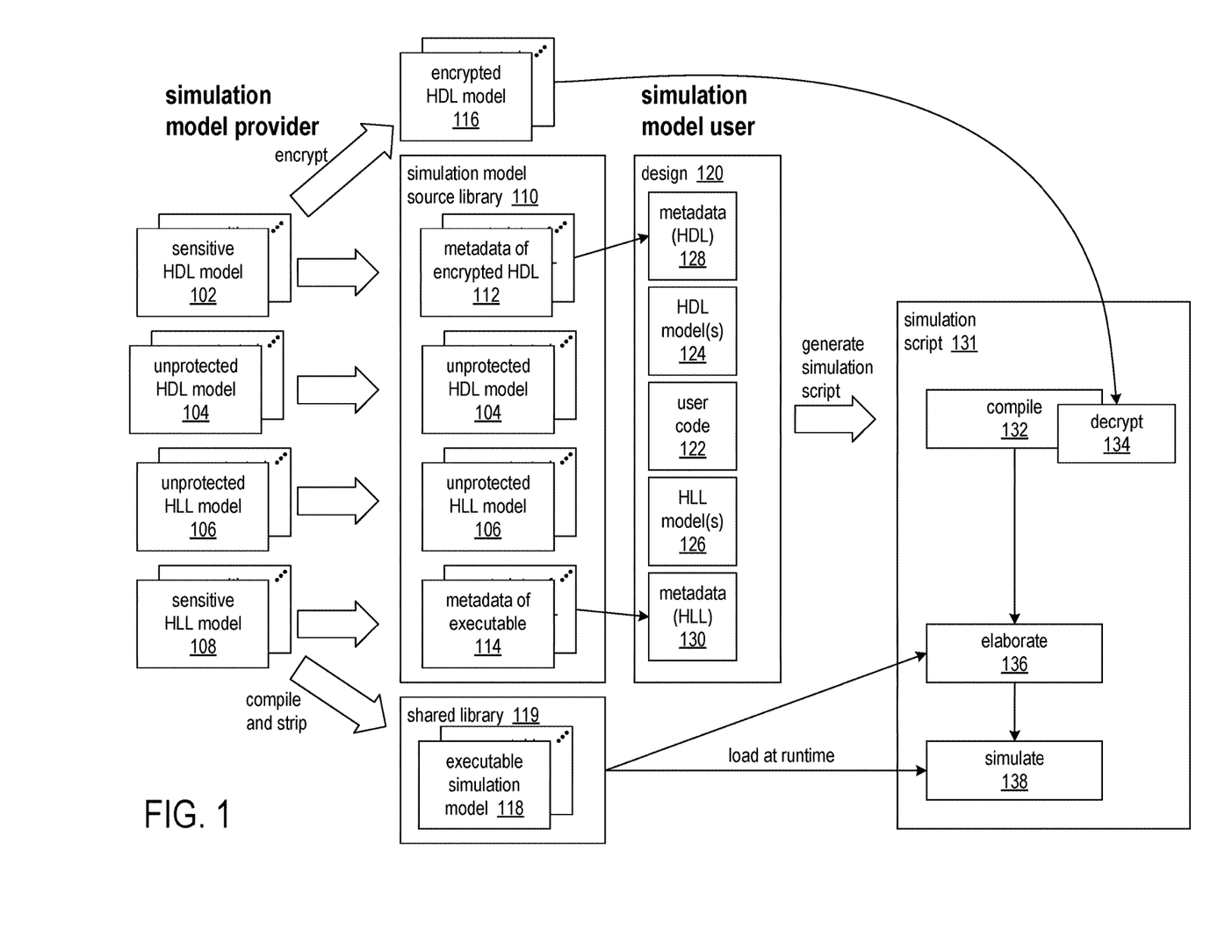
FIG. 1 is a flow diagram that illustrates provision of protected and unprotected HLL simulation models and of protected and unprotected HDL simulation models for simulating a circuit design.

FIG. 1 is a flow diagram that illustrates provision of protected and unprotected HLL simulation models, and of protected and unprotected HDL simulation models for simulating a circuit design. The flow shows data and processing associated with a provider of simulation models and an end-user of the simulation models. The provider of the simulation models can also provide a design tool to the end-user for performing a circuit simulation based on a user design having the associated simulation models.

A provider of simulation models can prepare sensitive HDL simulation models 102, unprotected HDL simulation models 104, unprotected HLL simulation models 106, and sensitive HLL simulation models 108. In packaging the simulation models 102, 104, 106, and 108 for delivery to end users, the format can vary according to whether the simulation model is designated as a sensitive simulation model or as an unprotected simulation model. It will be recognized that the simulation models 102, 104, 106, and 108 are associated corresponding HDL and HLL design objects (not shown) that can be included as part of a circuit design.

The simulation model provider can assemble a simulation model source library 110 that includes the unprotected HDL simulation models 104 and the unprotected HLL simulation models 106. In place of the source code specification of the sensitive HDL simulation models 102 and sensitive HDL simulation models 108, the simulation model provider can package metadata 112 of the sensitive HDL models and metadata 114 of executable simulation models 118, which are generated from the sensitive HLL simulation models 108, in the simulation model source library 110. For the sensitive HDL simulation models 102, the simulation model provider encrypts the sensitive HDL simulation models according to the IEEE-1735 encryption standard and packages the encrypted HDL models 116. The metadata 112 of the sensitive HDL simulation models can indicate file system locations of the encrypted HDL models 116 relative to an installation directory of the design tool or simulation model source library.

The simulation model provider can compile the sensitive HLL simulation models 108 into executable simulation models 118 and package and store the executable simulation models as a shared library 119. The metadata 114 of the executable simulation models 118 can be stored as part of the simulation model source library 110 and can indicate file system locations of the executable simulation models relative to an installation directory of the design tool or simulation model source library. In order to impede reverse engineering of the algorithms underlying the executable simulation models 118, the simulation model provider strips the symbol tables associated with the executable simulation models.

The simulation model provider can deliver the simulation model library 110, encrypted HDL models 116, and shared library 119, along with the corresponding HDL and HLL design objects, to an entity for use in creating a circuit design. Various electronic design automation tools can also be provided to enable a user to create and simulate a circuit design.

A circuit designer (or "user") can create a design 120 using selected circuit design objects (not shown), and the design can include/reference the simulation models corresponding to the selected design objects. The circuit design can include user code 122, which can include HDL modules, HLL modules, or a combination of HDL and HLL modules. The user code can call upon or include various HDL and/or HLL design objects (not shown) provided by the simulation model provider, and those design objects have corresponding simulation models. The unprotected simulation models for the selected design objects are the HDL simulation models 124 and HLL simulation models 126. The HDL simulation models 124 and HLL simulation models 126 can be specified as or include metadata that reference elements in the simulation model source library 110.

The disclosed approaches are not limited to the exemplary design 120 having HDL simulation models 124, HLL simulation models 126, metadata 128 of encrypted HDL simulation models 116, and metadata 130 of the shared library 119 of executable simulation models 118 as in design 120. That is the disclosed approaches are applicable to designs having various combinations of HDL simulation models 124, HLL simulation models 126, metadata 128 of encrypted HDL simulation models 116, and/or metadata 130 of the shared library 119 of executable simulation models 118.

For design objects that are part of the circuit design 120 and that have associated sensitive simulation models, the design 120 includes metadata 128 and metadata 130. Metadata 128 includes selected metadata from metadata 112 of the encrypted HDL simulation models 116, and metadata 114 includes selected metadata from metadata 114 of the executable simulation models 118.

The design tool generates a simulation script 131 based on the simulation user code 122, simulation models 124, 126, and metadata 128, 130 of the circuit design 120. In generating the simulation script, the design tool examines the metadata 128 to determine storage locations of the encrypted HDL models 116 and examines metadata 130 to determine the storage location of the shared library 119. Generally, the simulation script performs a three-stage flow that includes compilation, elaboration and simulation stages, which are shown as blocks 132, 136, and 138. Based on the metadata 128, the design tool can specify commands in the compilation stage 132 to reference one or more of the encrypted HDL models 116 to decrypt 134 and compile. Based on the metadata 130, the design tool can specify commands in the simulation stage 138 to load one or more of the executable simulation models 118 from the shared library 119.

The compilation stage 132 contains commands for compiling the user code, HDL models, and HLL models into an executable object.

The elaboration stage includes commands for resolving port names/types of the instantiated HDL modules/entities in the design and for creating a full graph of the resolved symbols/modules to create an executable object. For HLL modules of the design, the binding scripts verify port names and types against the interface of the HLL module, optionally using an HDL wrapper and empty HDL module in place of the HLL module. The resolution of the proper executable simulation model 118 is performed during simulation.

The simulation stage includes commands for executing the executable object produced by the elaboration stage. For HDL-based simulation models, symbols/modules were resolved during elaboration. For HLL-based simulation models, executable simulation models 118 of the shared library 119 are loaded into computer memory for execution during the simulation.

The simulation run-time performance improvements realized by the disclosed approaches occur predominantly in the compilation stage 132. For designs having HLL modules and associated executable simulation models 118, compile time is estimated to be reduced by ⅓ on average. The average reduction in time spent compiling the circuit design translates to improved computer performance of 33% during the compilation stage of simulating a circuit design.

Figure 2:
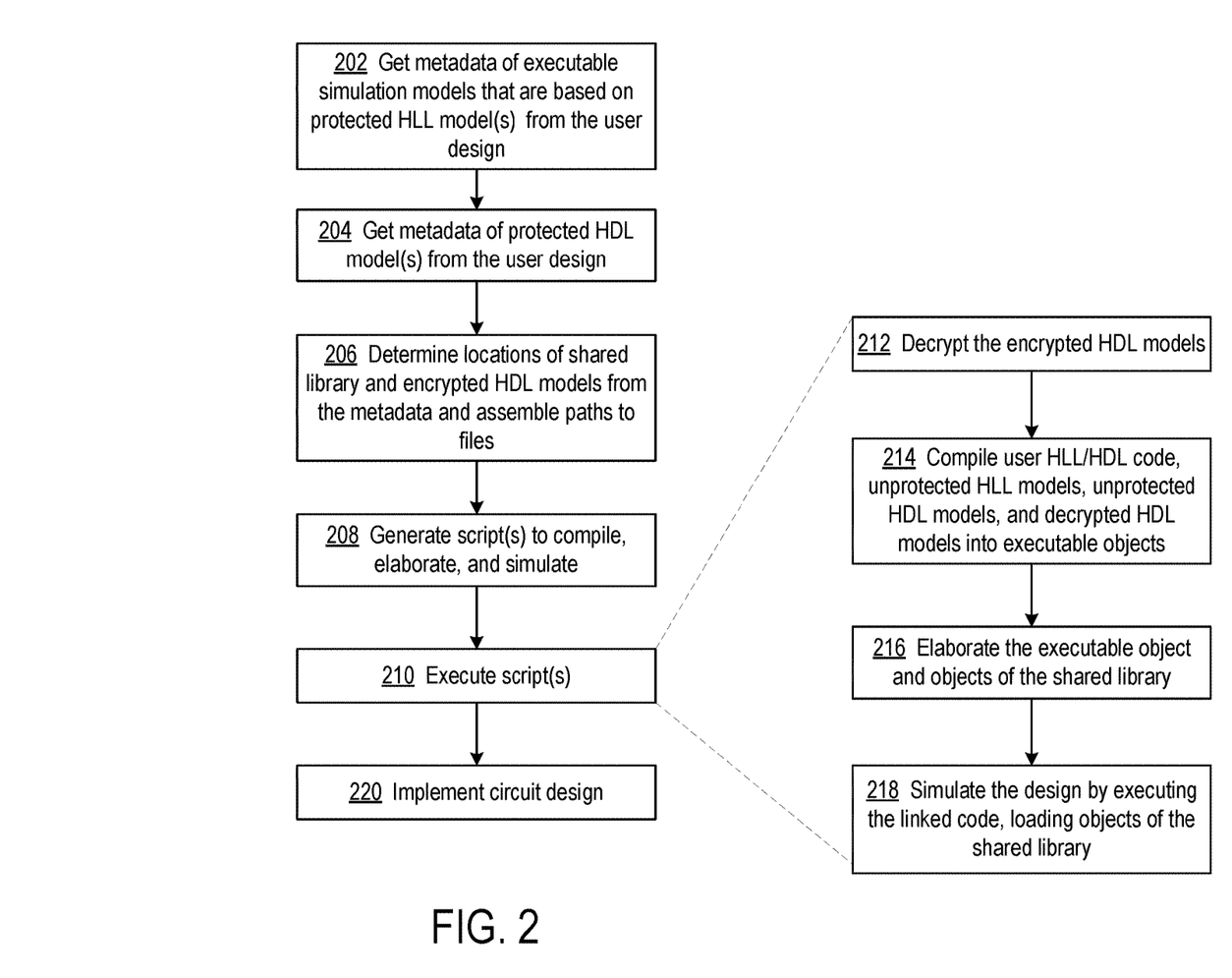
FIG. 2 shows a flowchart of a process of generating a simulation script, simulating using the generated script, and implementing a circuit design.

FIG. 2 shows a flowchart of a process of generating a simulation script 131 (FIG. 1), simulating using the generated script, and implementing a circuit design. In preparing to generate the simulation script, the design tool at block 202 inputs the circuit design and obtains the metadata 114 (FIG. 1) of the executable simulation models 118 (FIG. 1). At block 204, the design tool obtains the metadata 112 (FIG. 1) of the encrypted HDL models 116 (FIG. 1) from the circuit design. The metadata can be obtained by reading the circuit design data to determine the constituent HLL and HDL modules and further reading the corresponding and associated metadata.

At block 206, the design tool determines the storage locations of the shared library 119 of executable simulation models and of the encrypted HDL simulation models from the metadata 114 and metadata 112, respectively. The design tool also assembles file system paths to the executable simulation models and the encrypted HDL simulation models based on determined storage locations.

The design tool at block 208 generates a simulation script that contains invocation calls to simulator tools for compiling, elaborating and simulating the circuit design. The file system path of the encrypted HDL simulation models is specified in the portion of the simulation script for decrypting encrypted HDL simulation models, and the file system path of the executable simulation models of the shared library is specified in the portion of the simulation script for elaboration of the executable object created by the compilation.

At block 210, the design tool executes the simulation script to simulate the circuit design. The stages of the simulation script are shown by blocks 212, 214, 216, and 218. At block 212, the design tool decrypts the encrypted simulation models of the circuit design.

At block 214, the design tool compiles the user code (HLL and/or HDL), unprotected HLL simulation models, unprotected HDL simulation models, and decrypted HDL simulation models into executable objects. In one approach, the design tool invokes a simulator compiler tool that transforms the circuit design into a parse tree representation of the simulation models and then stores the parse tree in retentive storage. For a design that instantiates HDL/HLL simulation models, the parse tree representation of the pre-compiled models can be stored in the file system directory in which the design tool was installed. For the pre-compiled executable simulation models 118 of the shared library 119, the simulation compiler uses the file system location of the shared library to generate indexing files, which are used during elaboration and simulation to resolve the referenced ones of the executable simulation models.

The design tool invokes a simulator elaboration tool that elaborates the compiled simulation models at block 216. The elaboration can entail referencing and binding (otherwise referred to as "linking") of the executable objects in the parse tree with parse trees of individual ones of the executable simulation models that were instantiated in the design as indicated by the metadata. For an HDL-only design hierarchy in which HDL design code instantiates an HDL simulation model module or entity, the port names/types of the instantiated modules/entities are resolved and a complete graph of all the resolved symbols/modules is constructed.

For a mixed-language design hierarchy in which HDL design code instantiates the function of a sensitive HLL simulation model, the port names/types are verified using an intermediate HDL stub wrapper for the instantiated HLL module, and a black-box placeholder is created for the HLL module. The black-box placeholder is an instantiation of an empty HDL module to hold the HLL module. A full graph of the complete mixed language design hierarchy is constructed during simulation, at which time the empty HDL module definitions are replaced with the referenced executable simulation model. The final result of elaboration is an executable object that can be launched in simulation stage.

At block 218, the design tool invokes a simulator kernel tool that commences simulation by executing the executable object generated at block 216. For an HDL-only design, the elaborated graph was completed in the elaboration stage. For a mixed-language design involving HDL and HLL and the shared library of executable simulation models for sensitive HLL simulation models, the elaboration of the executable simulation models occurs during simulator initialization, before time-zero of the simulation. During initialization, the shared library model(s) is loaded into memory and the black-box placeholder modules are resolved.

If simulation results are satisfactory, at block 220, the user can initiate further electronic design automation (EDA) tools to implement the circuit design as an operable circuit. The EDA tools can create a netlist from the modules of the circuit design, map the netlist to circuit resources of a target integrated circuit (IC), place-and-route and optimize the mapped circuit design, and perform any desired additional simulation using the netlist information. The design tools can then create implementation data, such as configuration data for a programmable IC or fabrication data for constructing an application-specific (ASIC). A circuit can be implemented by way of configuring a programmable IC with the configuration data or fabricating, making, or producing an ASIC from the fabrication data, thereby creating a circuit that operates according to the circuit design.

Figure 3:
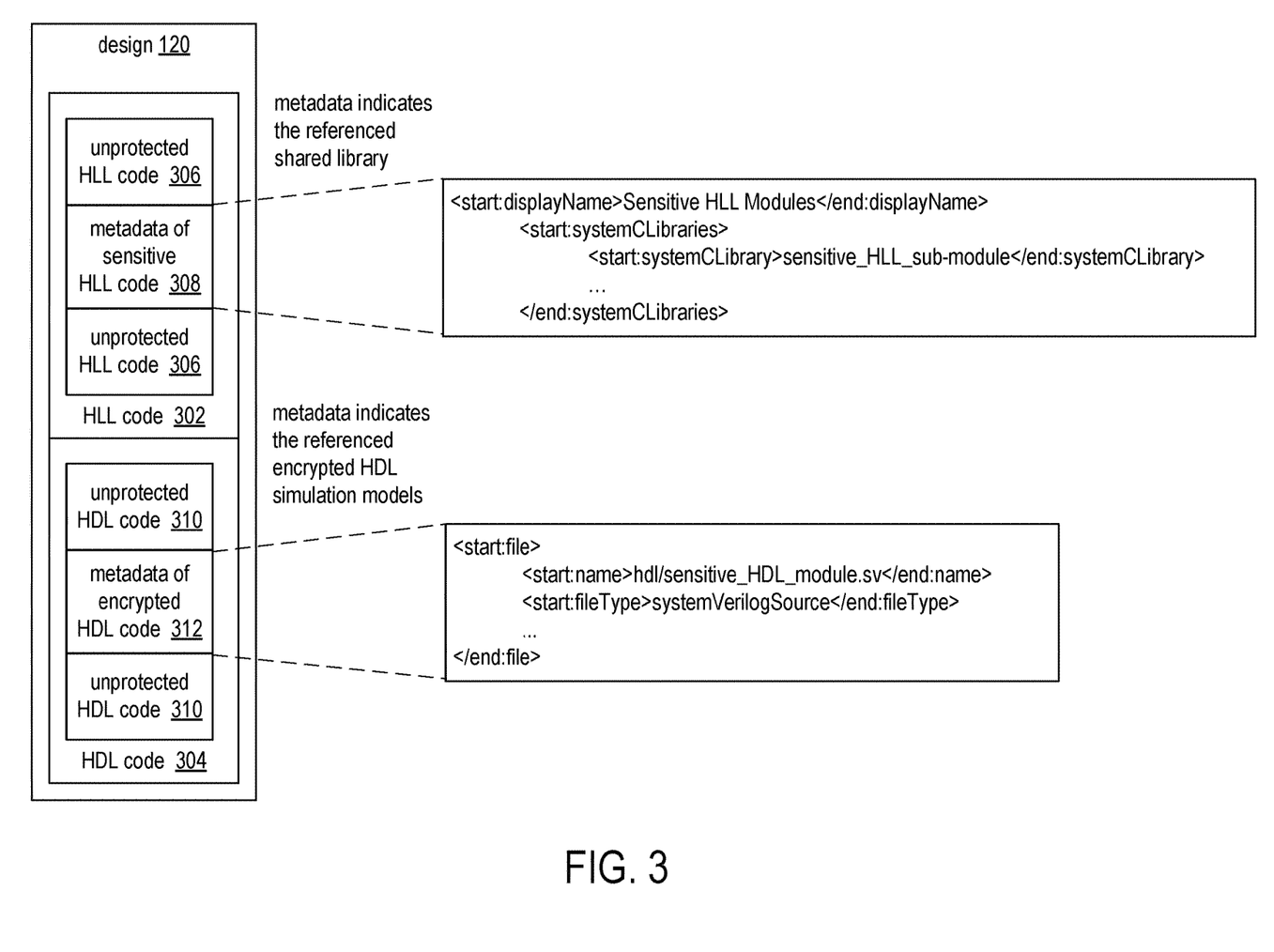
FIG. 3 shows an example of a portion of a circuit design having HLL code, metadata of sensitive HLL code, HDL code and metadata of encrypted HDL code.

FIG. 3 shows an example of a portion of a circuit design having HLL code, metadata of sensitive HLL code, HDL code and metadata of encrypted HDL code. The metadata of the HLL code is used during the elaboration phase of the simulation script for linking the executable simulation models to the other simulation code. The metadata of the encrypted HDL code is used to determine the location of the encrypted HDL for the compilation stage of the simulation script.

The design 120 includes HLL code 302 and HDL code 304. The HLL code 302 includes unprotected HLL code 306 and metadata 308 of sensitive HLL code. The HDL code 304 includes unprotected HDL code 310 and metadata of encrypted HDL code 312.

The metadata 308 of the sensitive HLL code indicates the shared library 119 (FIG. 1) of executable simulation models 118 (FIG. 1). As an example, the metadata 308 specifies "Sensitive HLL Modules" as the name to be displayed by the user interface for the shared library. The example further indicates that one of the executable simulation models in the shared library is referenced as "sensitive_HLL_sub-module."

The metadata 312 of encrypted HDL code indicates the encrypted HDL simulation model. As an example, the metadata 312 specifies that the file system path to the encrypted HDL simulation model is "hdl/sensitive_HDL_module.sv." The type of the encrypted HDL simulation model is "systemVerilogSource."

Figure 4:
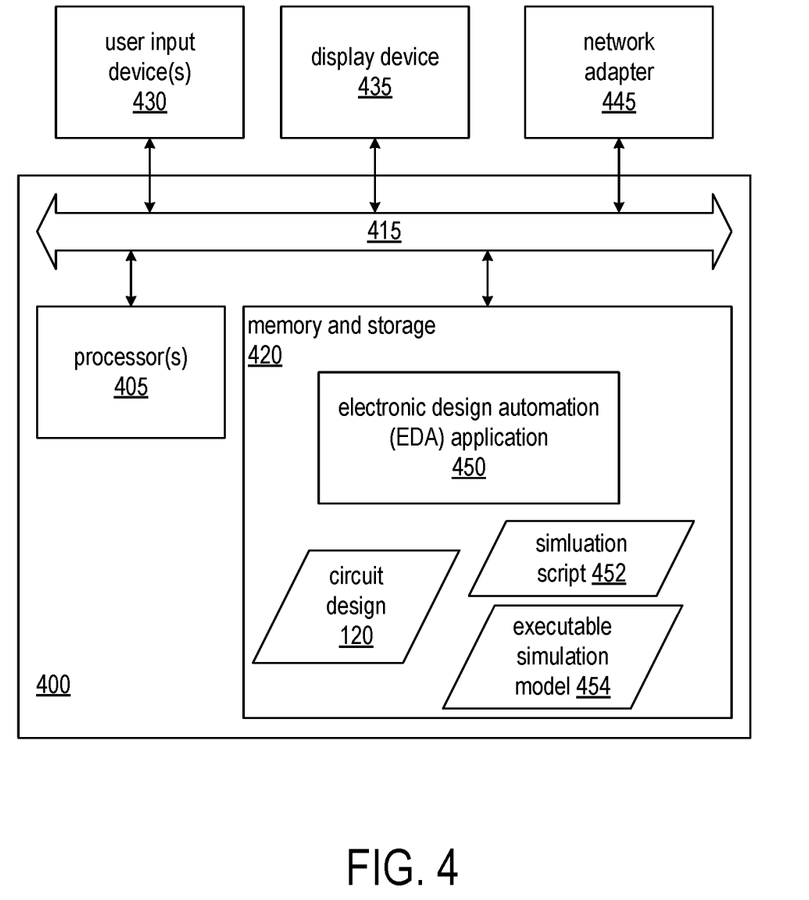
FIG. 4 is a block diagram illustrating an exemplary data processing system.

FIG. 4 is a block diagram illustrating an exemplary data processing system (system) 400. System 400 is an example of an EDA system. As pictured, system 400 includes at least one processor circuit (or "processor"), e.g., a central processing unit (CPU) 405 coupled to memory and storage arrangement 420 through a system bus 415 or other suitable circuitry. System 400 stores program code and circuit design 120 within memory and storage arrangement 420. Processor 405 executes the program code accessed from the memory and storage arrangement 420 via system bus 415. In one aspect, system 400 is implemented as a computer or other data processing system that is suitable for storing and/or executing program code. It should be appreciated, however, that system 400 can be implemented in the form of any system including a processor and memory that is capable of performing the functions described within this disclosure.

Memory and storage arrangement 420 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 400 may also include one or more cache memories (not shown) that provide temporary storage of at least some program code and data in order to reduce the number of times program code and data must be retrieved from local memory and persistent storage during execution.

Input/output (I/O) devices such as user input device(s) 430 and a display device 435 may be optionally coupled to system 400. The I/O devices may be coupled to system 400 either directly or through intervening I/O controllers. A network adapter 445 also can be coupled to system 400 in order to couple system 400 to other systems, computer systems, remote printers, and/or remote storage devices through intervening private or public networks. Modems, cable modems, Ethernet cards, and wireless transceivers are examples of different types of network adapter 445 that can be used with system 400.

Memory and storage arrangement 420 may store an EDA application 450. EDA application 450, being implemented in the form of executable program code, is executed by processor(s) 405. As such, EDA application 450 is considered part of system 400. System 400, while executing EDA application 450, receives and operates on circuit design 120. In one aspect, system 400 performs a design flow on circuit design 120, and the design flow can include generation of the simulation script 452 and executable simulation model 454, synthesis, mapping, placement, routing, and generation of circuit implementation data.

EDA application 450, circuit design 120, simulation script 452, executable simulation model 454, and any data items used, generated, and/or operated upon by EDA application 450 are functional data structures that impart functionality when employed as part of system 400 or when such elements, including derivations and/or modifications thereof, are loaded into an IC such as a programmable IC causing implementation and/or configuration of a circuit design within the programmable IC.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for simulating circuit designs. Other aspects and features will be apparent to those skilled in the art from consideration of the specification. It is intended that the specification and drawings be considered as examples only, with a true scope of the invention being indicated by the following claims.

What is claimed is:

1. A method comprising:
  inputting to a design tool executing on a computer system, a circuit design having unprotected high-level language (HLL) program code and first metadata of a shared library of executable simulation models that are based on sensitive HLL simulation models;
  determining by the design tool, a first storage location of the shared library based on the first metadata;
  compiling the unprotected HLL program code into an executable object by the design tool;
  linking the executable object with the library of executable simulation models from the first storage location by the design tool; and
  simulating the circuit design by executing the executable object and loading the executable simulation models in response to initiation by the executable object.

2. The method of claim 1, wherein the circuit design includes second metadata of a source library of unprotected HLL simulation models, and the method of claim 1 further comprising:
  determining a second storage location of the source library based on the second metadata; and
  wherein the compiling includes compiling the HLL program code and the unprotected HLL simulation models from the second storage location into the executable object.

3. The method of claim 2, further comprising:
  compiling a plurality of sensitive HLL simulation models into the executable simulation models;
  storing the executable simulation models as the shared library; and storing the unprotected HLL simulation models as the source library.

4. The method of claim 3, wherein the compiling the plurality of sensitive HLL simulation models includes stripping symbol tables from the executable simulation models.

5. The method of claim 1, wherein the circuit design includes second metadata of encrypted HDL simulation models, the method further comprising:
  determining a second storage location of the encrypted HDL simulation models based on the second metadata;
  wherein the compiling includes:
    decrypting the encrypted HDL simulation models into source HDL simulation models; and
    compiling the circuit design and the source HDL simulation models into the executable object.

6. The method of claim 5, wherein the circuit design includes third metadata of a source library of unprotected HLL simulation models and unprotected HDL simulation models, the method further comprising:
  determining a third storage location of the source library based on the third metadata;
  wherein the compiling includes:
    obtaining the unprotected HLL simulation models and unprotected HDL simulation models from the third storage location; and
    compiling the unprotected HLL program code, the unprotected HDL simulation models, and the unprotected HLL simulation models into the executable object.

7. The method of claim 1, wherein the circuit design includes second metadata of a source library of unprotected HLL simulation models and third metadata of encrypted HDL simulation models, the method further comprising:
  determining a second storage location of the source library based on the second metadata and a third storage location of the encrypted HDL simulation models based on the third metadata;
  wherein the compiling includes:
    obtaining the unprotected HLL simulation models based on the second metadata and the encrypted HDL simulation models based on the third metadata;
    decrypting the encrypted HDL simulation models into source HDL simulation models; and
    compiling the HLL program code, the unprotected HLL simulation models, and the source HDL simulation models into the executable object.

8. The method of claim 7, wherein the circuit design includes fourth metadata of a source library of unprotected HDL simulation models, and the method further comprising:
  determining a fourth storage location of the unprotected HDL simulation models based on the fourth metadata;
  wherein the compiling includes:
    obtaining the unprotected HDL simulation models based on the fourth metadata; and
    compiling the HLL program code, the unprotected HLL simulation models, the source HDL simulation models, and the unprotected HDL simulation models into the executable object.

9. The method of claim 1, wherein:
  the circuit design includes HDL code; and
  the compiling includes compiling the unprotected HLL program code and the HDL code into the executable object.

10. The method of claim 1, further comprising:
  generating implementation data from the circuit design; and
  making an integrated circuit based on the implementation data.

11. A system comprising:
  one or more computer processors; and
  a memory arrangement coupled to the one or more computer processors, wherein the memory arrangement is configured with instructions that when executed by the one or more computer processors cause the one or more computer processors to perform operations including:
    inputting a circuit design having unprotected high-level language (HLL) program code and first metadata of a shared library of executable simulation models that are based on sensitive HLL simulation models;
    determining by the design tool, a first storage location of the shared library based on the first metadata;
    compiling the unprotected HLL program code into an executable object;
    linking the executable object with the library of executable simulation models from the first storage location by the design tool; and
    simulating the circuit design by executing the executable object and loading the executable simulation models in response to initiation by the executable object.

12. The system of claim 11, wherein the circuit design includes second metadata of a source library of unprotected HLL simulation models, and the memory arrangement is configured with instructions that when executed by the one or more computer processors cause the one or more computer processors to perform operations including:
  determining a second storage location of the source library based on the second metadata; and
  wherein the instructions for compiling include instructions that when executed by the one or more computer processors cause the one or more computer processors to compile the HLL program code and the unprotected HLL simulation models from the second storage location into the executable object.

13. The system of claim 12, wherein the memory arrangement is configured with instructions that when executed by the one or more computer processors cause the one or more computer processors to perform operations including:
  compiling a plurality of sensitive HLL simulation models into the executable simulation models;
  storing the executable simulation models as the shared library; and
  storing the unprotected HLL simulation models as the source library.

14. The system of claim 13, wherein the instructions for compiling the plurality of sensitive HLL simulation models include instructions that when executed by the one or more computer processors cause the one or more computer processors to strip symbol tables from the executable simulation models.

15. The system of claim 11, wherein the circuit design includes second metadata of encrypted HDL simulation models, and the memory arrangement is configured with instructions that when executed by the one or more computer processors cause the one or more computer processors to perform operations including:
  determining a second storage location of the encrypted HDL simulation models based on the second metadata;
  wherein the instructions for compiling include instructions that when executed by the one or more computer processors cause the one or more computer processors to:

decrypt the encrypted HDL simulation models into source HDL simulation models; and compile the circuit design and the source HDL simulation models into the executable object.

16. The system of claim 15, wherein the circuit design includes third metadata of a source library of unprotected HLL simulation models and unprotected HDL simulation models, and the memory arrangement is configured with instructions that when executed by the one or more computer processors cause the one or more computer processors to perform operations including:

determining a third storage location of the source library based on the third metadata;

wherein the instructions for compiling include instructions that when executed by the one or more computer processors cause the one or more computer processors to:

obtain the unprotected HLL simulation models and unprotected HDL simulation models from the third storage location; and compile the unprotected HLL program code, the unprotected HDL simulation models, and the unprotected HLL simulation models into the executable object.

17. The system of claim 11, wherein the circuit design includes second metadata of a source library of unprotected HLL simulation models and third metadata of encrypted HDL simulation models, and the memory arrangement is configured with instructions that when executed by the one or more computer processors cause the one or more computer processors to perform operations including:

determining a second storage location of the source library based on the second metadata and a third storage location of the encrypted HDL simulation models based on the third metadata;

wherein the instructions for compiling include instructions that when executed by the one or more computer processors cause the one or more computer processors to:

obtain the unprotected HLL simulation models based on the second metadata and the encrypted HDL simulation models based on the third metadata;

decrypt the encrypted HDL simulation models into source HDL simulation models; and compile the HLL program code, the unprotected HLL simulation models, and the source HDL simulation models into the executable object.

18. The system of claim 17, wherein the circuit design includes fourth metadata of a source library of unprotected HDL simulation models, and the memory arrangement is configured with instructions that when executed by the one or more computer processors cause the one or more computer processors to perform operations including:

determining a fourth storage location of the unprotected HDL simulation models based on the fourth metadata;

wherein the instructions for compiling include instructions that when executed by the one or more computer processors cause the one or more computer processors to:

obtain the unprotected HDL simulation models based on the fourth metadata; and compile the HLL program code, the unprotected HLL simulation models, the source HDL simulation models, and the unprotected HDL simulation models into the executable object.

19. The system of claim 11, wherein:

the circuit design includes HDL code; and the instructions for compiling include instructions that when executed by the one or more computer processors cause the one or more computer processors to compile the unprotected HLL program code and the HDL code into the executable object.

20. The system of claim 11, wherein the memory arrangement is configured with instructions that when executed by the one or more computer processors cause the one or more computer processors to perform operations including:

generating implementation data from the circuit design; and making an integrated circuit based on the implementation data.

* * * * *